United States Patent [19]

Harrison et al.

[11] Patent Number: 5,406,629
[45] Date of Patent: Apr. 11, 1995

[54] APPARATUS AND METHOD FOR DIGITALLY PROCESSING SIGNALS IN A RADIO FREQUENCY COMMUNICATION SYSTEM

[75] Inventors: Robert M. Harrison, Grapevine, Tex.; Terry M. Schaffner, Palatine, Ill.

[73] Assignee: Motorola, Inc., Schaumburg, Ill.

[21] Appl. No.: 170,627

[22] Filed: Dec. 20, 1993

[51] Int. Cl.$^6$ ............................................. H04K 1/10
[52] U.S. Cl. ...................................... 380/34; 375/205; 375/334; 370/18; 455/52.1; 455/65
[58] Field of Search ................. 375/1, 88, 91, 96, 100, 375/101; 370/18, 19, 21, 22, 20; 380/34; 455/52.1, 65

[56] References Cited

U.S. PATENT DOCUMENTS

| | | | |
|---|---|---|---|
| 4,621,337 | 11/1986 | Cates et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,159,608 | 10/1992 | Falconer et al. | 375/1 |
| 5,224,122 | 6/1993 | Bruckert | 375/1 |
| 5,295,153 | 3/1994 | Gudmundson | 375/1 |
| 5,305,349 | 4/1994 | Dent | 375/1 |

OTHER PUBLICATIONS

Fundamentals of Digital Image Processing by Anil K. Jain, University of California, Davis, 1989 by Prentice-Hall, Inc., pp. 155-159, 185-187.

*Primary Examiner*—David C. Cain
*Attorney, Agent, or Firm*—Raymond J. Warren; Daniel C. Crilly

[57] ABSTRACT

A plurality of input signals are processed (75) using a Hadamard transform (52) to produce a combined Walsh covered parallel sequence which is sampled in time. The time samples are commutated (76) by a switch (53) or multiplexer to form a Walsh covered serial sequence. The Walsh covered serial sequence is then quadrature phase shift keyed (77) and transmitted (79).

20 Claims, 2 Drawing Sheets

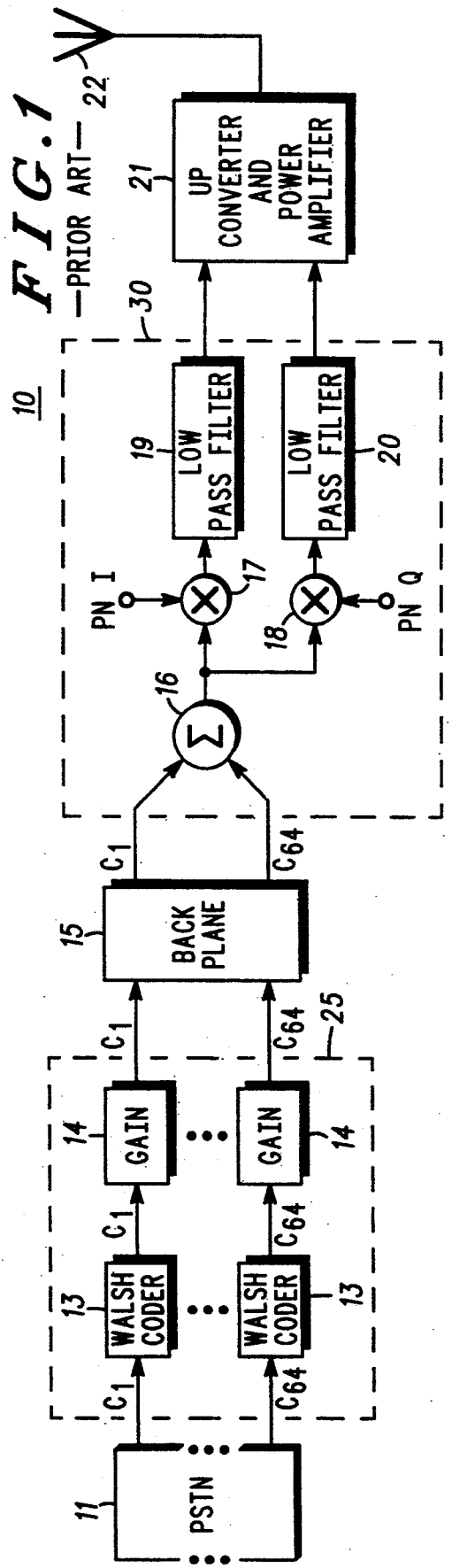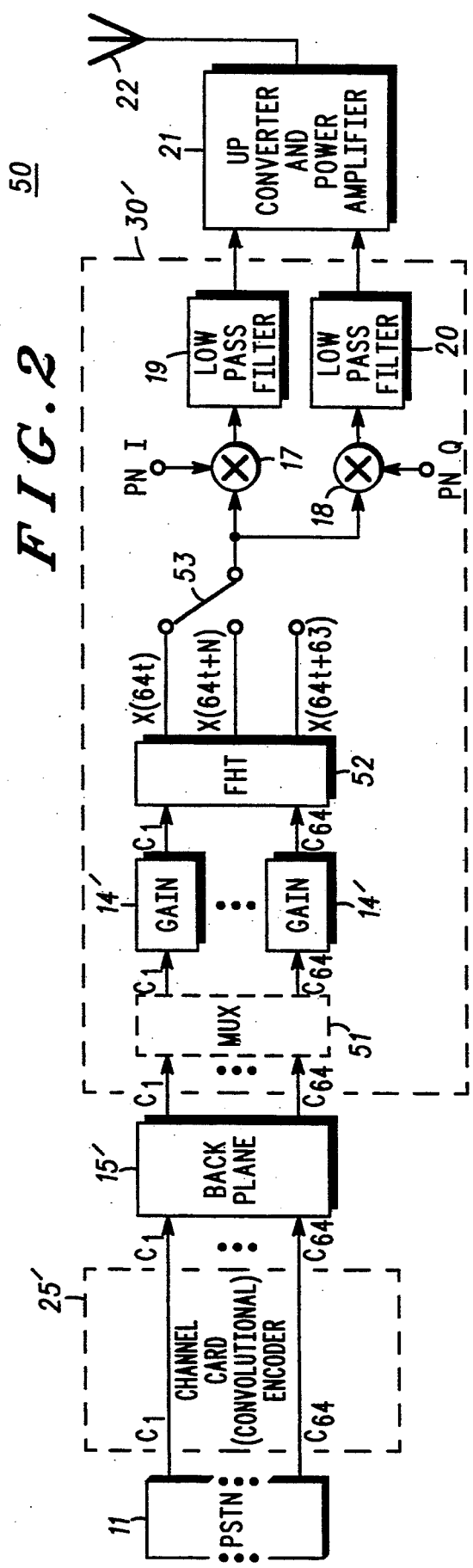

APPARATUS AND METHOD FOR DIGITALLY PROCESSING SIGNALS IN A RADIO FREQUENCY COMMUNICATION SYSTEM

FIELD OF THE INVENTION

The present invention relates, in general, to Radio Frequency (RF) communication and, more particularly, to an apparatus and method for digital processing signals in an RF communication system.

BACKGROUND OF THE INVENTION

Digital combiners are presently proposed for digital RF communications networks. The digital RF networks currently being implemented fall into two general categories: time division multiple access (TDMA) and code division multiple access (CDMA). With respect to CDMA systems, a plurality of communication signals will be transmitted simultaneously over a particular bandwidth. In order to decorrelate the signals, each call is "spread" using a different spreading code, also known as a Walsh code. These spread signals are then combined and transmitted simultaneously.

A problem faced by present systems is that of the data rate which must be carried through the backplane of a transceiver. Presently, the signals to be transmitted are processed on a channel card which raises the data rate from 19.2 kilobits per second (kbps) to 11.1 Megabits per second (Mbps). Since there are 9 bits per sample, this data rate corresponds to a sample rate of 1.23 MHz per channel. Each of these channels is then transmitted from the channel card to a baseband digital combiner through a backplane. With 64 signals being transmitted, the data rate through the backplane is 708 Mbps. These 64 signals are then combined at the 1.23 MHz sample rate, and the combined signal sample rate is raised to 4.91 MHz through an up-sampling filter.

Therefore, a need exists for a transmitter design that will reduce the complexity of the channel card and reduce the data rate being conducted over a backplane.

BRIEF DESCRIPTION OF THE DRAWINGS

FIG. 1 is a block diagram of a prior art transceiver;

FIG. 2 is a block diagram of a transceiver embodying the present invention; and

DETAILED DESCRIPTION OF THE DRAWINGS

Figure 3:
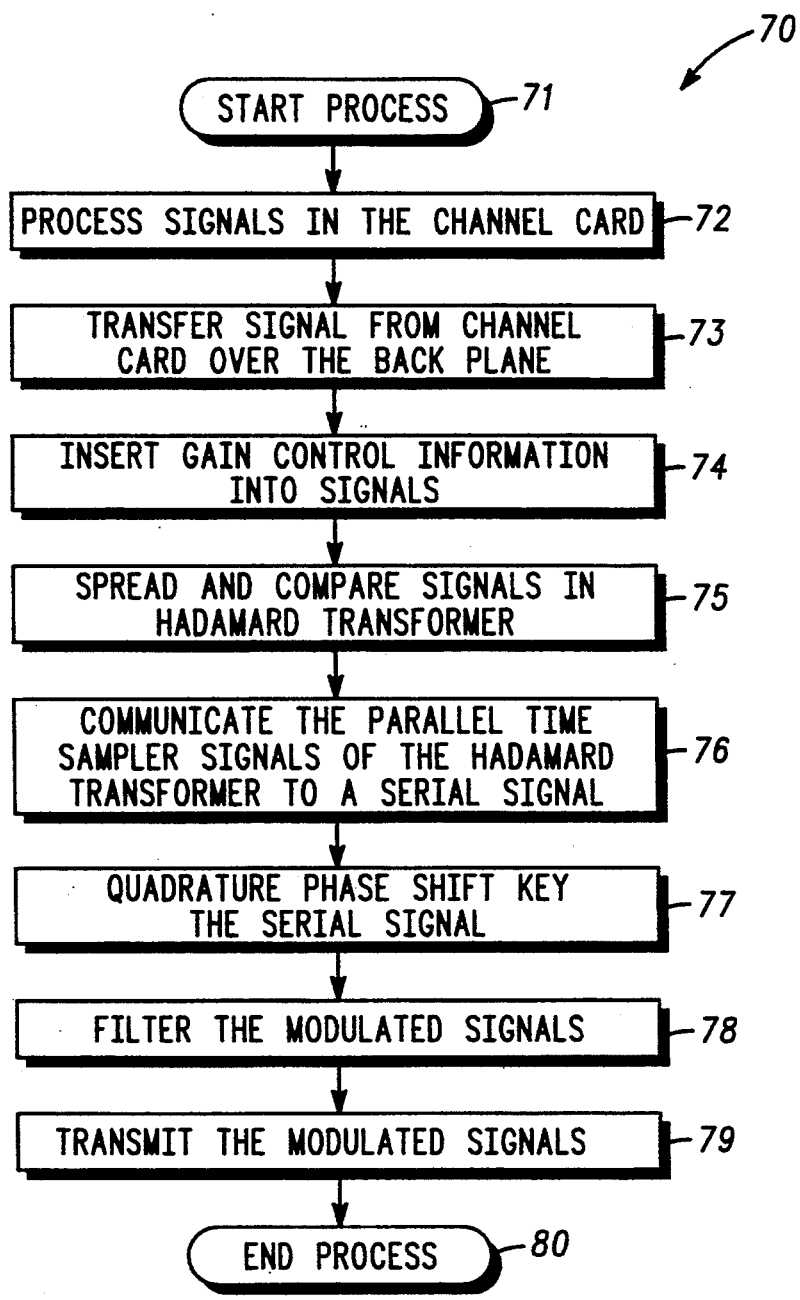
FIG. 3 is a flow chart representing the method of the present invention.

Referring initially to FIG. 1, a block diagram of a prior art transceiver, generally designated 10, is illustrated. Transceiver 10 is coupled, at one end, to a public switched telephone network (PSTN) 11 and comprises, generally, a channel card 25 and a baseband digital combiner 30 coupled by a backplane 15. In addition, an upconverter and a power amplifier 21 are coupled to the output of combiner 30 to provide a transmit signal to drive antenna 22.

In operation, a plurality of signals (64 signals in this embodiment) are received from PSTN 11 for transmission. The 64 signals from PSTN 11 are processed in channel card 25. In channel card 25, the signals, inter alia, are interleaved, voice coded (vocoded), and forward error corrected (FEC) using a convolutional encoder. These 19.2 kbps signals are then spread using a Walsh spreading code in Walsh coder 13. In Walsh coder 13, the bits are repeated 64 times and multiplied by the Walsh sequence for the channel. This produces an output from Walsh coder 13 of 1.2288 Megabits per second (Mbps) for each channel.

Following spreading, each signal is gain controlled in gain circuit 14. This increases the number of bits by a factor of nine and increases the data rate for each signal to 11.0592 Mbps. Each of the 64 signals is then transmitted over backplane 15 to baseband digital combiner 30. At full operation, the 64 signals being transferred at 11.0592 Mbps will require a backplane operating at 707.789 Mbps. This requires a backplane of very high bandwidth.

Once the signals are to combiner 30, they are combined in summer 16. In order to sum these signals together at this data rate, summer 16 must perform 78.6 Million Adds per second (MAdds/s). Following the addition, the output signal from summer 16 has a sample rate of 1.2288 MHz. The signal output from adder 16 is then mixed with the appropriate I (In-phase) and Q (Quadrature-phase) pseudo random numbers (PN I and PN Q) in mixers 17 and 18, respectively. This provides the I and Q components of the quadrature signals to be transmitted. The I and Q signals are next up-sampled to 4.9152 MHz and filtered using low pass filters (LPFs) 19 and 20. The filtered signals are output from combiner 30 to upconverter and power amplifier 21 and transmitted using antenna 22.

The invention, described below, reduces the number of computations being performed when the signals are combined and also reduces the data rate through the backplane. This is accomplished using the transceiver, generally designated 50, illustrated in FIG. 2.

In general, the spreading and gain control functions have been removed from channel card 25' and have been placed in baseband digital combiner 30'. This serves to greatly reduce the bandwidth needed on backplane 15'. In addition, a Fast Hadamard Transformer (FHT) 52 is used to perform both the signal spreading and combining functions.

In particular, FIG. 2 shows the 64 signals being provided from PSTN 11 to channel card 25'. In channel card 25', the signals are still interleaved, vocoded, and forward error corrected as before. The data rate of each signal at this point is still at 19.2 kbps. These signals are then provided to backplane 15' for transmission to combiner 30'. The result is that the bandwidth needed in the backplane has been reduced from 707.789 Mbps to 1.2288 Mbps. This represents a reduction of backplane bandwidth by a factor of 576.

The backplane signals are then provided to combiner 30'. At this point, an optional multiplexer (MUX) 51 may be utilized. MUX 51 is provided to allow flexibility in design. If a channel, $C_1$ through $C_{64}$, is associated with a particular Walsh code, there is no need to provide MUX 51. However, if there is a need to be able to dynamically apply the incoming channel to a selected spreading code, then MUX 51 may be used. MUX 51 may be placed at any location prior to FHT 52.

The signals, still at 19.2 kbps, are provided to gain devices 14'. These operate in the same manner as devices 14 and result in an increase in the bit rate from 19.2 kbps to 172.8 kbps, or 11.0592 Mbps for all 64 signals. The outputs of gain devices 14' are provided to FHT 52 which provides both the spreading function of Walsh coders 13 and the combining function of summer 16. The inputs to FHT 52 represent channels $C_1$ through $C_{64}$ while the outputs represent sample times $X_{(64t)}$ through $X_{(64t+63)}$.

In FHT 52, $N\log_2 N$ adds/subtracts are required to compute the output for each sample time where N is 64. Since there are 64 points in the FHT, 6*64 or 384 adds/subtracts are needed per transform. At a sample rate of 19.2 kilohertz (kHz) and 384 adds/subtracts per transform, FHT 52 operates at 7.37 MAdds/s. This reduces the number of adds/subtracts over the prior art by a factor of 11.

The first output $X_0$ from FHT 52 is the combined signals at the first sample time (where t=0). The second output $X_1$ from FHT 52 is the second sample and so forth until 64 samples have been taken. The cycle then repeats. The parallel sample outputs from FHT 52 are then commutated to form a single serial data stream. In this particular embodiment, the commutating is performed by switch 53.

The signal output from FHT 52 is then mixed with the appropriate I and Q pseudo random numbers (PN I and PN Q) in mixers 17 and 18, respectively. This provides the I and Q components of the quadrature signals to be transmitted. The I and Q signals are next filtered using low pass filters (LPFs) 19 and 20. The filtered signals are output from combiner 30' to upconverter and power amplifier 21 and transmitted using antenna 22.

In FIG. 3, a flow chart illustrating the process, generally designated 70, of the present invention is illustrated. Process 70 starts processing at step 71 when signals are received. The signals are first processed in the channel card, step 72, before being transferred over the backplane, step 73.

The signals are then gain controlled, step 74. The gain controlled signals are next spread and summed, step 75, in the Hadamard transformer. The parallel time sampled signals from the Hadamard transformer are then communicated into a serial signal, step 76. The serial signal is quadrature binary phase shift keyed, step 77, and then filtered, step 78. The filtered signal is then transmitted, step 79 and the process flow ends at step 80.

In addition to the processing savings, system modularity is enhanced by allowing a single board to be changed in order to upgrade the spreading codes, PN codes, and digital filters.

Thus, it will be apparent to one skilled in the art that there has been provided in accordance with the invention, a method for operating an apparatus and method for digital combining signals in a radio frequency transmitter that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method of digitally processing a plurality of input signals for RF transmission, said method comprising the steps of:
    performing a Hadamard transform on said plurality of input signals to produce a combined parallel sequence; and
    commutating said combined parallel sequence to a serial sequence.

2. The method of claim 1 wherein said Hadamard transform is a fast Hadamard transform.

3. The method of claim 1 wherein said Hadamard transform is a discrete Hadamard transform.

4. The method of claim 1 wherein said step of commutating is performed using one of a multiplexer and a switch.

5. The method of step 1 further comprising, prior to the step of performing a Hadamard transform, the steps of:
    error correction encoding each of said plurality of input signals; and
    gain controlling each of said plurality of input signals.

6. The method of claim 5 wherein said error correction encoding is performed by a convolutional encoder.

7. The method of claim 1 further comprising the steps of:
    phase shift keying the serial sequence forming a plurality of quadrature binary phase shifted signals;
    filtering each of said plurality of quadrature binary phase shifted signals creating a plurality of filtered signals; and
    transmitting said plurality of filtered signals.

8. The method of claim 7 wherein said phase shift keying is quadrature phase shift keying.

9. The method of claim 7 wherein said step of filtering is performed by a plurality of low pass filters.

10. An RF system having a digital combiner comprising:
    Hadamard transformer means for transforming a plurality of inputs into a plurality of output signals, said Hadamard transformer means having a plurality of inputs each coupled to receive one of a plurality of signals to be transmitted; and
    commutating means for converting a parallel output of said Hadamard transformer to a serial signal.

11. The digital combiner of claim 10 wherein said Hadamard transformer means is a discrete Hadamard transformer.

12. The digital combiner of claim 10 wherein said Hadamard transformer means is a fast Hadamard transformer.

13. The digital combiner of claim 10 wherein said Hadamard transformer means receives said plurality of signals to be transmitted and produces a plurality of time sampled signals representing a combination of said plurality of signals to be transmitted.

14. The digital combiner of claim 10 wherein said commutating means comprises a switch having a plurality of inputs coupled to said parallel output of said Hadamard transformer means and an output providing said serial signal.

15. The digital combiner of claim 10 wherein said commutating means is a multiplexer.

16. The digital combiner of claim 10 further comprising a plurality of gain means, each for adjusting a gain of one of said plurality of signals to be transmitted, said plurality of gain means each having an input coupled to receive one of said plurality of signals to be transmitted and an output coupled to one of said plurality of inputs of said Hadamard transformer means.

17. An RF system having a digital combiner comprising:
    a Hadamard transformer having a plurality of inputs each coupled to receive one of a plurality of signals to be transmitted; and a commutator having a parallel input coupled to said parallel output of said Hadamard transformer and a serial output.

18. The digital combiner of claim 17 wherein said Hadamard transformer receives said plurality of signals to be transmitted and produces a plurality of time sampled signals representing a combination of said plurality of signals to be transmitted.

19. The digital combiner of claim 17 wherein said commutator comprises a switch having a plurality of inputs coupled to said parallel output of said Hadamard transformer and an output.

20. The digital combiner of claim 17 wherein said commutator is a multiplexer.

* * * * *